(12) United States Patent
Zushi et al.

(10) Patent No.: US 6,536,274 B1
(45) Date of Patent: Mar. 25, 2003

(54) FLOW VELOCITY DETECTOR (75) Inventors: Nobuhiko Zushi, Tokyo (JP); Shoji Kamiunten, Tokyo (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 09/762,989

(22) PCT Filed: Jun. 14, 2000

(86) PCT No.: PCT/JP00/03845

§ 371 (c)(1),
(2), (4) Date: Apr. 16, 2001

(87) PCT Pub. No.: WO00/77478

PCT Pub. Date: Dec. 21, 2000

(30) Foreign Application Priority Data

Jun. 14, 1999 (JP) ............................................ 11-166372

(51) Int. Cl.⁷ ................................................. G01F 1/68
(52) U.S. Cl. ................................................... 73/204.26
(58) Field of Search ........................ 73/204.26, 204.25, 73/204.23, 204.17, 204.11

(56) References Cited

U.S. PATENT DOCUMENTS 4,651,564 A * 3/1987 Johnson et al. ................ 73/204
5,852,239 A * 12/1998 Sato et al. ................. 73/204.26

* cited by examiner

*Primary Examiner*—Hezron Williams
*Assistant Examiner*—Jewel V. Thompson
(74) *Attorney, Agent, or Firm*—Blakely Sokoloff Taylor & Zafman (57) ABSTRACT A flow velocity detector, wherein an upstream side temperature sensor (3U1) and a downstream side temperature sensor (3D1) are disposed on both sides of a heater (2-1) with the recessed and projected direction of the heater (2-1) in comb tooth-shape positioned approximately in parallel with the flow direction A of a detected fluid, whereby heat from the heater (2-1) first heats the crank-shaped connection parts (J) of the temperature sensors (3U1, 3D1) in comb tooth shape, respectively, and then transfers through straight line parts (S) along the crank-shapes in the direction approximately in parallel with the flow direction of the detected fluid.

10 Claims, 7 Drawing Sheets

FLOW VELOCITY DETECTOR

BACKGROUND

1. Field of the Invention

The present invention relates to a flow velocity detector for detecting flow velocity of a detected fluid (for example, air).

2. Description of the Related Art

Figure 12:
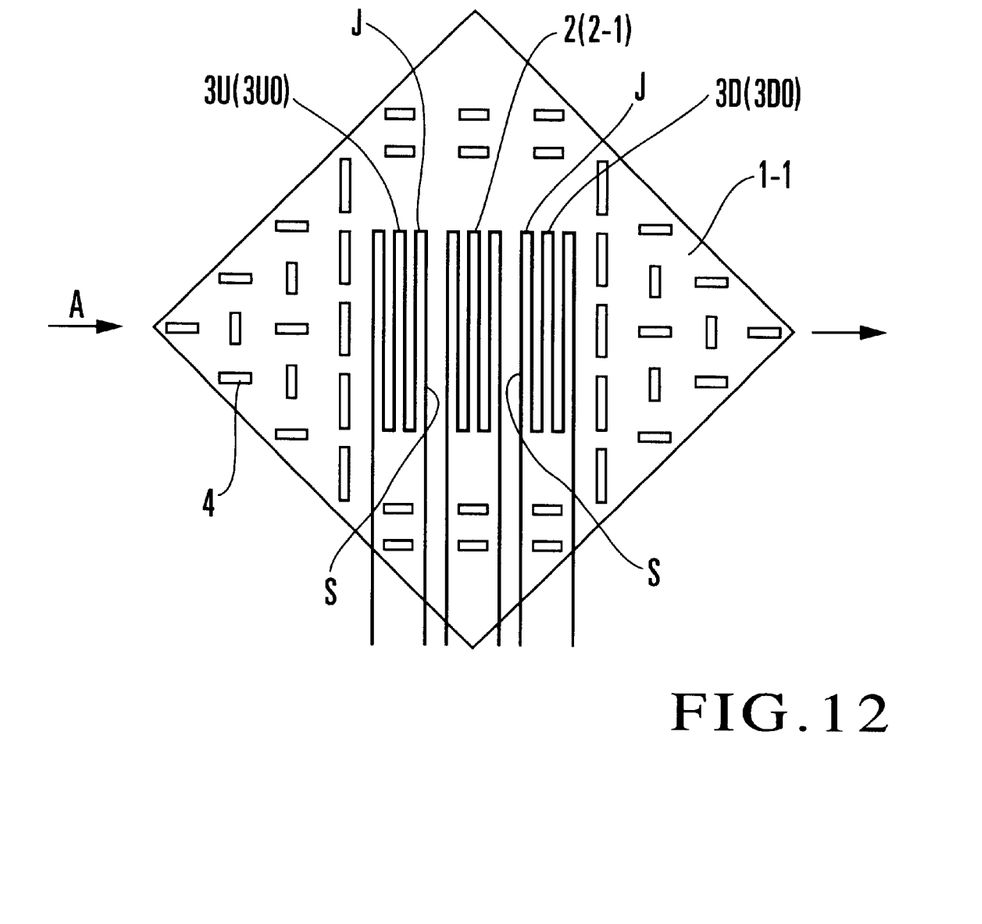
FIG. 12 is a plan view of a diaphragm portion of a conventional flow velocity detector.
Figure 13:
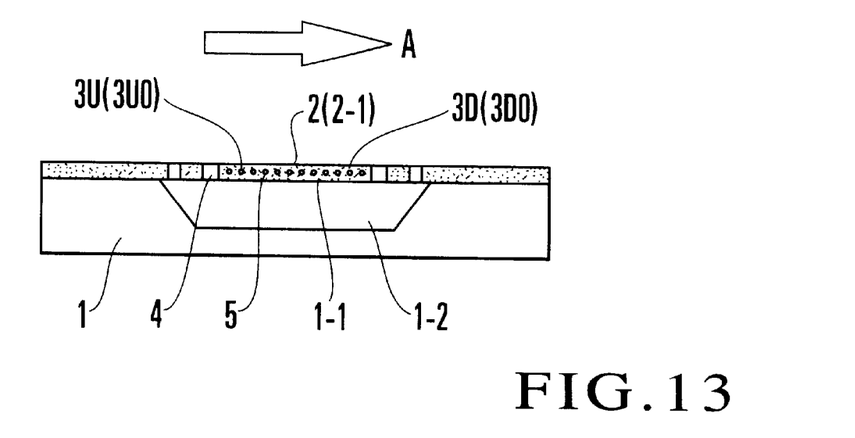
FIG. 13 is a sectional side elevation showing an approximate cross section structure of a conventional flow velocity detector.

Conventionally, as a flow velocity detector of this kind, a diaphragm type flow velocity detector consisting of two sensors and a heater element has been used. FIG. 13 is an approximate cross section structure of a conventionally existing diaphragm type flow velocity detector. In addition, FIG. 12 is a plan view of this diaphragm portion. In FIG. 12 and FIG. 13, 1 is a silicon chip (a substrate), 1-1 is a diaphragm portion being formed in a thin wall shape providing a cavity 1-2 on a top face of a substrate 1, 2 (2-1) is a heater (a heater) of a metal thin film formed on the diaphragm portion 1-1, 3U (3U0) and 3D (3D0) are heat-sensitive resistor elements (temperature sensors) of the metal thin film formed on both sides of the heater 2, and 4 is a slit penetrating through the diaphragm.

The heater 2 and the temperature sensors 3U, 3D are covered by an insulating layer 5 of thin film consisting of silicon nitride, for example. The heater 2 and the temperature sensors 3U, 3D are formed in a comb tooth-shape connecting a plurality of crank shapes, and a recessed and projected direction of this comb tooth-shape is positioned approximately perpendicularly to the flow direction A of a detected fluid.

A principle of a flow rate measurement method using this flow velocity detector is described. The heater 2 is driven so that its temperature becomes higher by a predetermined temperature than the ambient temperature, and the temperature sensors 3U, 3D are driven with a constant current or a constant voltage. Under the driving condition thus described, when a flow rate of a detected fluid is zero, the temperature of the temperature sensors 3U, 3D becomes the same, and no differences are caused in the resistance values of the temperature sensors 3U, 3D. When there is a flow of a detected fluid, the temperature sensor (an upstream side temperature sensor) 3U located upstream is cooled, because its heat is carried away by the flow of the detected fluid that goes to the direction of the heater 2. On the other hand, the temperature sensor (a downstream side temperature sensor) 3D located downstream is heated by the flow of the detected fluid heated with the heater 2. By the occurrence of the temperature difference between said upstream side and down stream side, the differences are caused in the resistance values of the upstream side temperature sensor 3U and the downstream side temperature sensor 3D. In the above-mentioned flow velocity detector, a flow rate of the detected fluid is obtained by detecting the difference of this resistance value as the difference of a voltage value.

Figure 11:
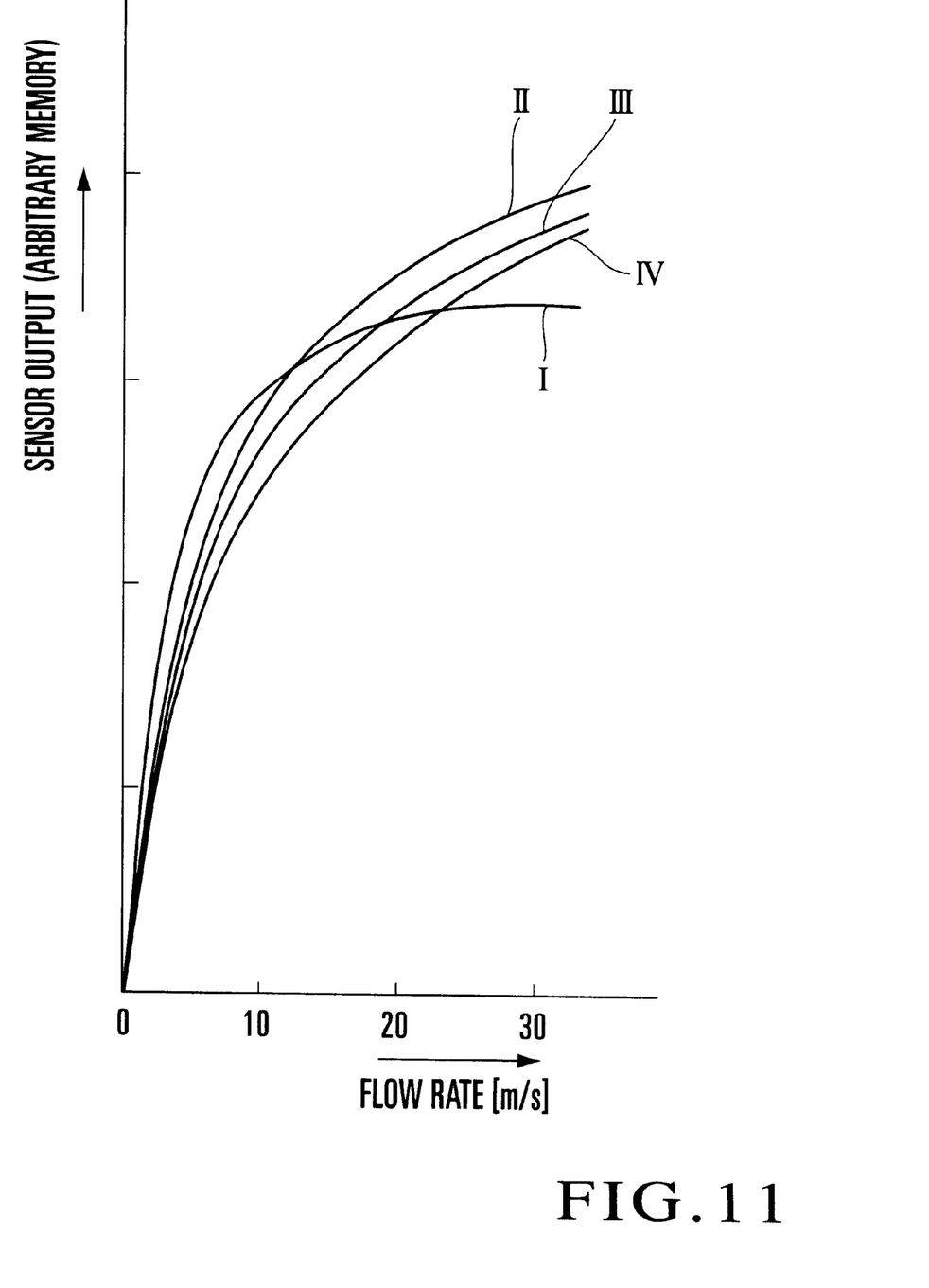
FIG. 11 is a diagram showing a comparison of the flow rate-sensor output characteristics of a flow velocity detector related to the conventional art and the present invention.

However, there was a problem in the above-mentioned conventional flow velocity detector that, when a flow rate of the detected fluid becomes, for example, larger than 20 m/s, the temperature of the temperature sensors 3U, 3D becomes saturated making it impossible to detect a flow rate. The relationship between a flow rate and a sensor output is shown in FIG. 11. The characteristics I as shown in said drawing are the flow rate—sensor output characteristics of a conventional flow velocity detector, and the sensor output is saturated from the neighborhood of 20 m/s, making it impossible to detect a high flow rate. This is caused by the low heat association between the heater 2 and the temperature sensors 3U, 3D.

As the constitution to raise the heat association between the heater 2 and the temperature sensors 3U, 3D, the applicant of this invention has proposed a flow rate sensor as shown in the Official Gazettes of the Japanese Patent Publication No. Hei 4-74672 (prior application 1) and the Japanese Patent Publication No. Hei 6-68451 (prior application 2). In the prior application 1, the heat association is raised by superposing a heater and a temperature sensor on the diaphragm, making it possible to detect a high flow rate. In the prior application 2, the heat association is raised by covering with a metal layer the top of a heater and a temperature sensor which are placed beside on the diaphragm, making it possible to detect a high flow rate.

However, in the prior application 1 and the prior application 2, each had a problem that the manufacturing was difficult and the mass production was difficult also, although the detection of a high flow rate was made possible by raising the heat association between the heater and the temperature sensor.

For example, in prior application 1, a pattern of a heater is formed, in the first place, on the surface of a diaphragm by the first production process. Next, an insulation film is formed on the formed heater (the second production process), and further, a pattern of a temperature sensor is formed on an insulation film (the third production process). In this case, at the time of the completion of the first production process, when it is observed from the micro-viewpoint, it has a form that a pattern of a heater is protruded from the diaphragm surface. Generally, it is difficult to form a pattern by the subsequent production process on the surface of such an irregularity, and it is because of this that a mass production has become difficult. In addition, it is difficult to secure the reliability of the electrical insulation between a heater and a temperature sensor by the above-mentioned second production process, making it difficult to proceed with the mass production.

In addition, there is the situation that the mechanical distortion will be caused by a difference of a thermal expansion of each film, when the temperature sensor is formed on the heater as in the prior application 1, and when the top of the heater and the temperature sensor is covered with a metal film layer as in the prior application 2. Said mechanical distortion influences the resistance value of the temperature sensor (temperature sensor acts like a distortion gauge), causing an error of flow rate detection value to become greater, and in particular, a characteristics dispersion in the product at the time of a mass production increases, and as a result, the mass production becomes difficult.

SUMMARY

In order to eliminate the above-mentioned problems, in the flow velocity detector according to the present invention, a temperature sensor is disposed with the recessed and projected direction of a comb tooth-shape positioned approximately in parallel with a flow direction of a detected fluid.

According to this invention, the heat from a heater heats the crank-shaped connection parts of the temperature sensors formed in a comb tooth-shape, and then transfers through straight line parts along the crank shapes of the temperature sensors in the direction approximately in parallel with the flow direction of the detected fluid.

DETAILED DESCRIPTION

Embodiments of the present invention will be described below with reference to the accompanying drawings.

Figure 1:
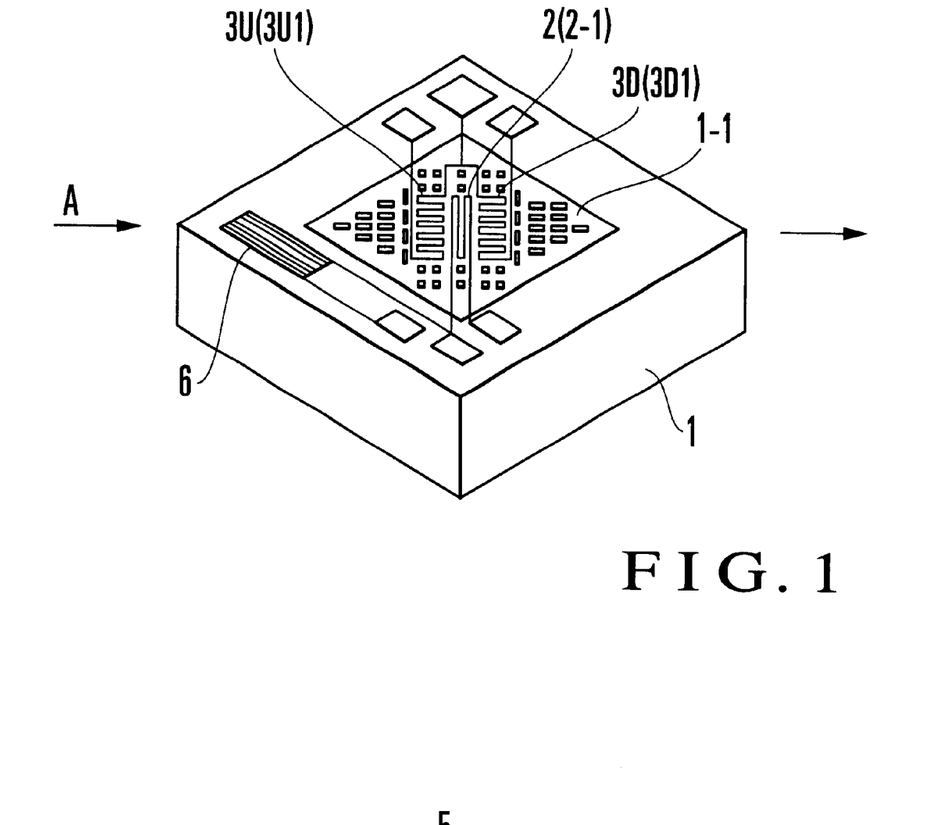
FIG. 1 is a perspective diagram showing one embodiment of a flow velocity detector related to the present invention.
Figure 2:
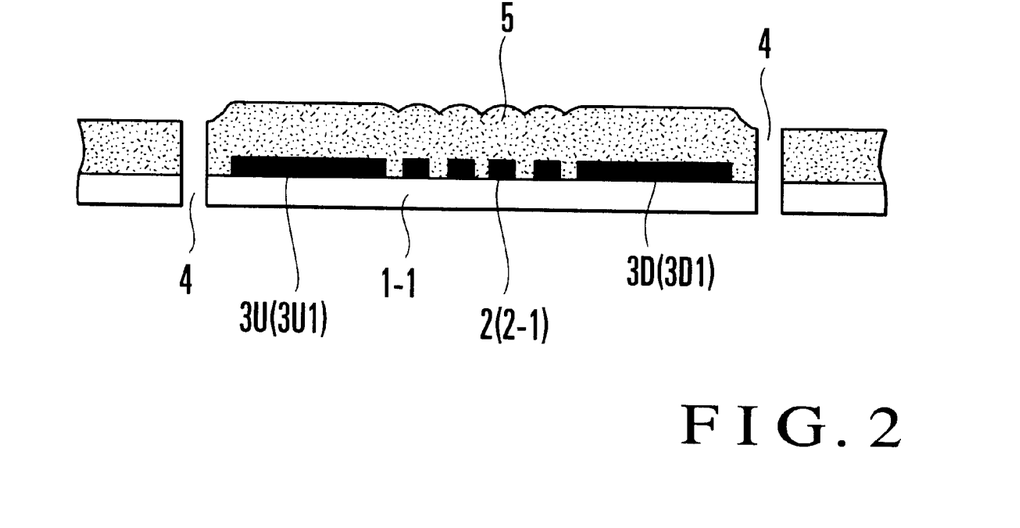
FIG. 2 is an expanded sectional view of a central part of a diaphragm portion of a flow velocity detector related to the present invention as seen from a lateral direction along a flow direction of a detected fluid.

FIG. 1 is a perspective diagram showing one embodiment of a flow velocity detector related to the present invention. In addition, FIG. 2 is an expanded sectional view of a central part of a diaphragm portion of a flow velocity detector of FIG. 1 as seen from a lateral direction along a flow direction of a detected fluid. In FIG. 1, FIG. 2, since the same symbols as in FIG. 12, FIG. 13 show the same constituting elements, those descriptions are omitted.

In the present embodiment, an upstream side temperature sensor 3U1 and a downstream side temperature sensor 3D1 are disposed on both sides of a heater 2-1, and a recessed and projected direction of a comb tooth-shape of each temperature sensor 3U1, 3D1 is positioned approximately in parallel with the flow direction A of a detected fluid. Each temperature sensor 3U1, 3D1, is in the shape of zigzag conditions with a plurality of connections of the cranks that a going and a return are in parallel with each other, like having traced a contour of a comb tooth-shape. Such a shape will be hereinafter referred to as a comb tooth-shape. Therefore, each temperature sensor 3U1, 3D1, is positioned with the purpose that a long parallel portion which is facing and positioned in a crank shape, namely an extended direction of a comb tooth, becomes in parallel with a flow direction of a detected fluid. In addition, as for the long portion parallel to each other of a crank shape, each has substantially an equal length, the short portion, which connects an adjacent long portion crossing at right angles at the edge portion of a long portion, is positioned to be even on the same straight line. In other words, each temperature sensor 3U1, 3D1 makes an extending direction of a comb tooth as a pitch direction, and said pitch direction is positioned so that it crosses a flow direction of a detected fluid.

Further, a symbol 6 in FIG. 1 is an ambient temperature sensor (a temperature sensor) formed at the edge portion of the substrate 1. In addition, in the lower side of a diaphragm portion 1-1, a cavity 1-2 is formed in the like manner as a conventional flow velocity detector shown in FIG. 13. Because the constitution (structure, material, manufacturing method, signal processing method) other than the pattern layout of each temperature sensor 3U1, 3D1 is disclosed by the above-mentioned Official Gazettes of the Japanese Patent Publication No. Hei 4-74672, the Japanese Patent Publication No. Hei 6-68451, the Japanese Patent Application Laid Open No. Sho 61-88532, etc., the description in detail here will be omitted.

Figure 3:
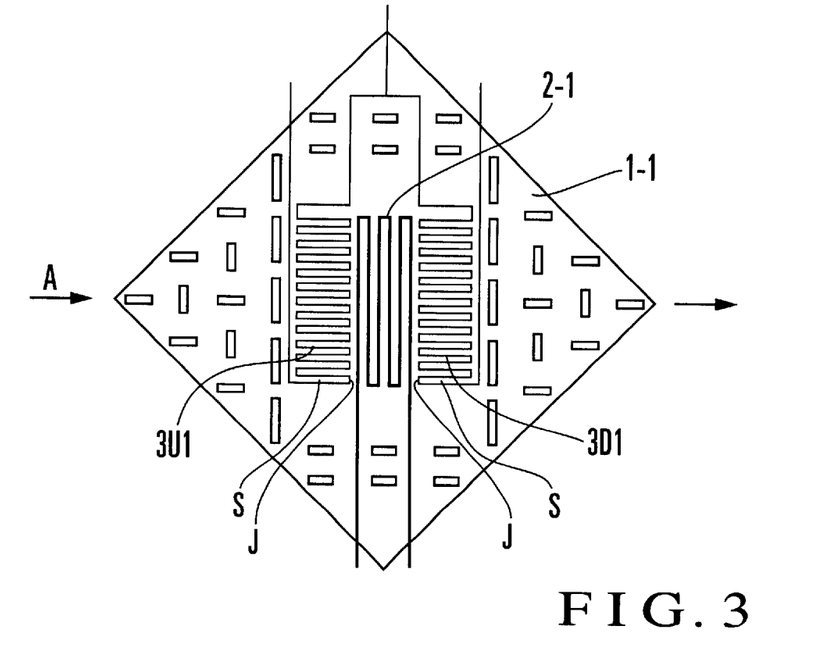
FIG. 3 is a plan view of a diaphragm portion of a flow velocity detector related to the present invention.

Because, according to a flow velocity detector in the form of the present embodiment, the thermal conductivity of each temperature sensor 3U, 3D consisting of metals, is far greater than the thermal conductivity of a diaphragm portion 1-1 consisting of an insulating material, the heat transfer condition is greatly controlled by the pattern shape of each temperature sensor 3U, 3D. Therefore, the heat from the heater 2-1 heats the crank-shaped connection parts J (refer to FIG. 3) of each temperature sensor 3U1, 3D1 formed in a comb tooth-shape, and further transfers through straight line parts S along the crank shapes of the connection parts J in the direction approximately in parallel with the flow direction of the detected fluid. Because of this, the heat from the heater 2-1 effectively reaches the parts far from the heater 2-1 of each temperature sensor 3U1, 3D1. As thus described, according to the flow velocity detector of the present embodiment, the heat association between the heater 2-1 and each temperature sensor 3U1, 3D1 becomes greater, making it possible to detect a high flow rate. It is desirable here that the heater 2-1 and the crank-shaped connection parts J of each temperature sensor 3U1, 3D1 be positioned as near as possible to each other.

As explained above, according to the present embodiment, since a quantity of the heat supply from the heater 2-1 to each temperature sensor 3U1, 3D1 increases, and since the thermal association of both increases, even if a flow rate of a detected fluid becomes fast, the temperature of each temperature sensor 3U1, 3D1 is hard to be saturated, making it possible to detect a high flow rate. In addition, this is effective for the temperature saturation measures of the upstream side temperature sensor 3U1 in particular. Further, since a quantity of the heat supply to each temperature sensor 3U1, 3D1 increases, the power consumption of the heater 2-1 increases by the increment. The flow rate-sensor output characteristics of this instance is shown in FIG. 11 as the characteristics II. In the conventional characteristics I, the sensor output has been saturated from the neighborhood of 20 m/s. However, in the characteristics II by the present embodiment, even if 20 m/s is exceeded, the sensor output varies depending on a flow rate, and it is recognized that the detection of a high flow rate is made possible.

Further, according to the conventional pattern layout of each temperature sensor 3U0, 3D0 as shown in FIG. 12, the heat from the heater 2-1 is transferred through the straight line parts S of the side adjacent to the heater 2-1 in the direction approximately perpendicular to the flow direction of the detected fluid, not from the crank shaped connection parts J of each temperature sensor 3U0, 3D0 formed in a comb tooth-shape, and said heat escapes toward the edge portion in the direction perpendicular to the flow of the diaphragm portion 1-1, and said heat is not effectively transferred to the parts far from the heater 2-1 of each temperature sensor 3U0, 3D0. On the other hand, according to the present embodiment, since the heat from the heater 2-1 is effectively transferred to the parts far from the heater 2-1 of each temperature sensor 3U1, 3D1, the heat association between the heater 2-1 and each temperature sensor 3U1, 3D1 becomes greater, making it possible to detect a high flow rate.

Figure 4:
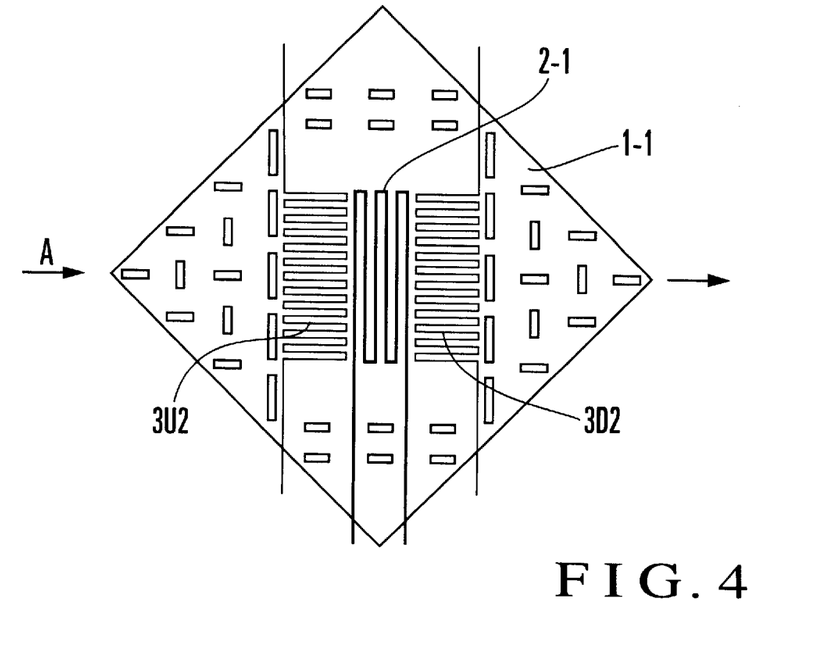
FIG. 4 is a plan view showing an example of a variation of a pattern layout of the temperature sensor and the heater on a diaphragm portion of a flow velocity detector related to the present invention.
Figure 5:
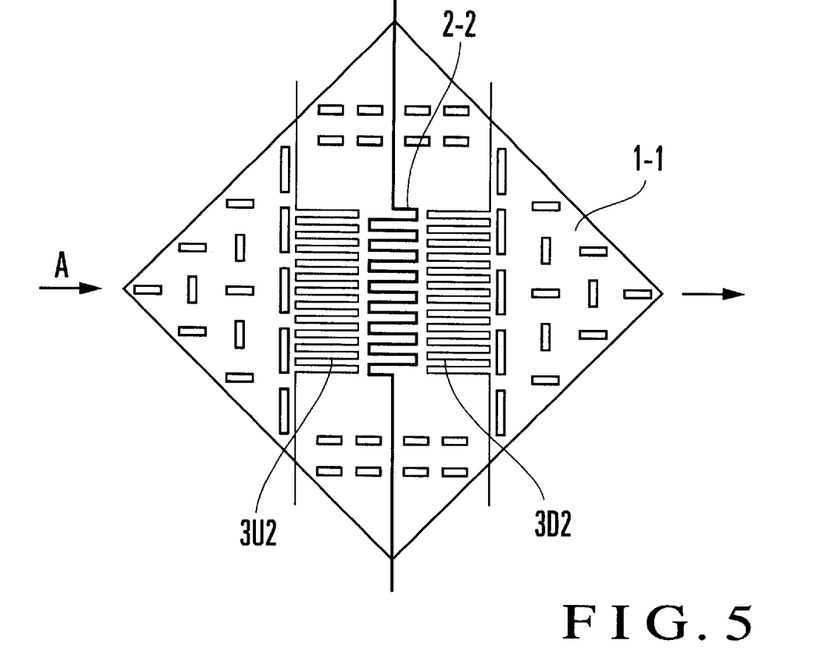
FIG. 5 is a plan view showing an example of a variation of a pattern layout of the temperature sensor and the heater on a diaphragm portion of a flow velocity detector related to the present invention.
Figure 6:
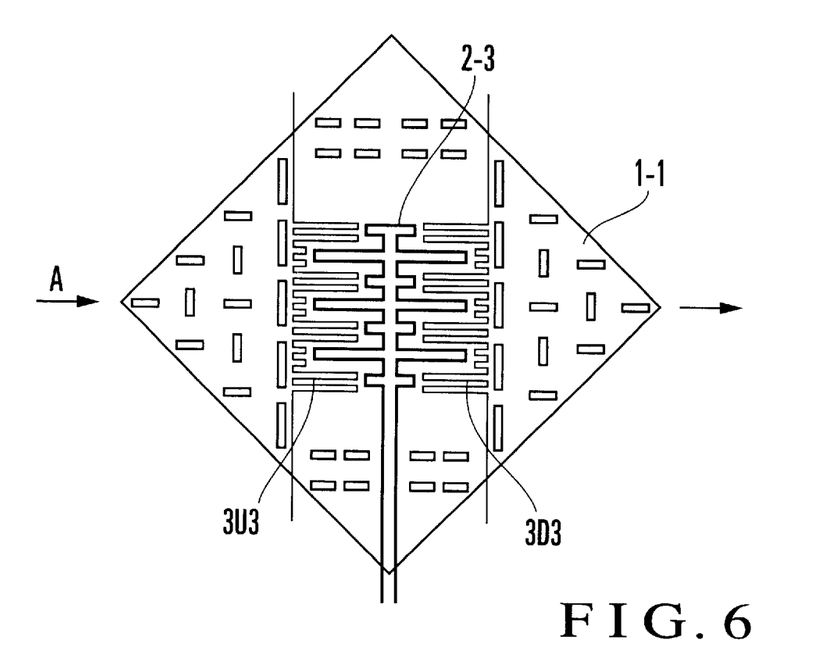
FIG. 6 is a plan view showing an example of a variation of a pattern layout of the temperature sensor and the heater on a diaphragm portion of a flow velocity detector related to the present invention.

The examples of the variations of the pattern layout are shown in FIG. 4—FIG. 10. In FIG. 5, the heater 2-2 with the recessed and projected direction of a comb tooth-shape of the heater 2-2 is positioned approximately parallel to the flow direction A of the detected fluid. In FIG. 6, parts of the respective irregularities of these comb tooth-shapes of the heater 2-3 and each temperature sensor 3U3, 3D3 are grouped together and positioned in such a way that they cut into each other.

Figure 7:
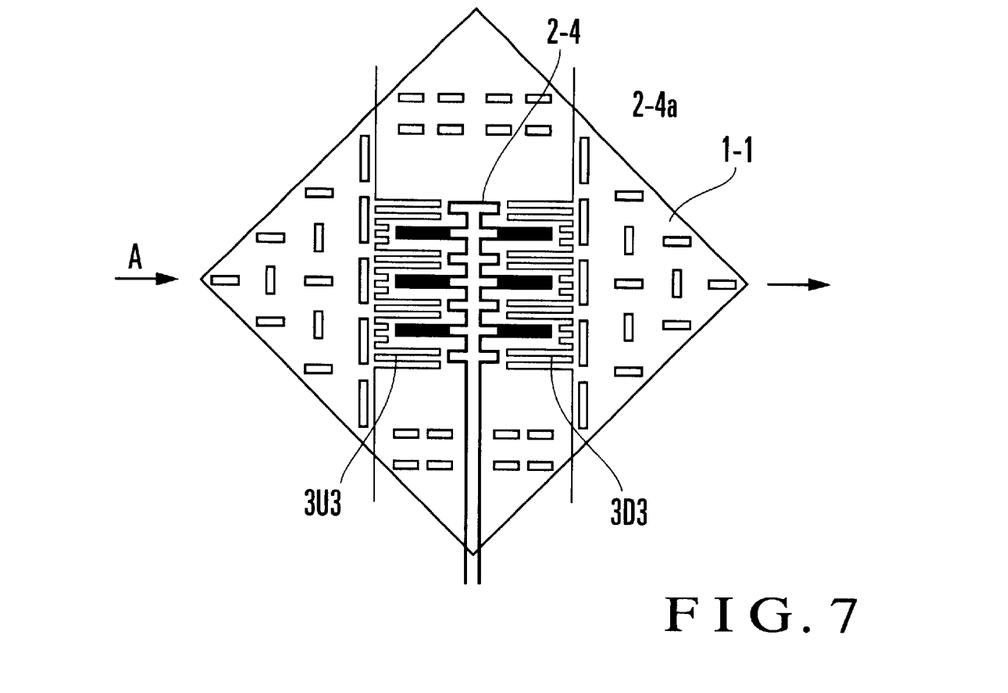
FIG. 7 is a plan view showing an example of a variation of a pattern layout of the temperature sensor and the heater on a diaphragm portion of a flow velocity detector related to the present invention.

In FIG. 7, parts of the respective irregularities of these comb tooth-shapes of the heater 2-4 and each temperature sensor 3U3, 3D3 are positioned in such a way that they cut into each other, and on the other hand, convex parts 2-4a, which cut into each temperature sensor 3U3, 3D3 of the comb tooth-shape of the heater 2-4, are formed wide in a flow direction of the detected fluid, so that the resistance value of the heater 2-4 does not become too great. If the heater resistance becomes too great, the necessary current will not flow unless the drive voltage is increased, and therefore, the above-mentioned constitution is applied in FIG. 7.

Figure 8:
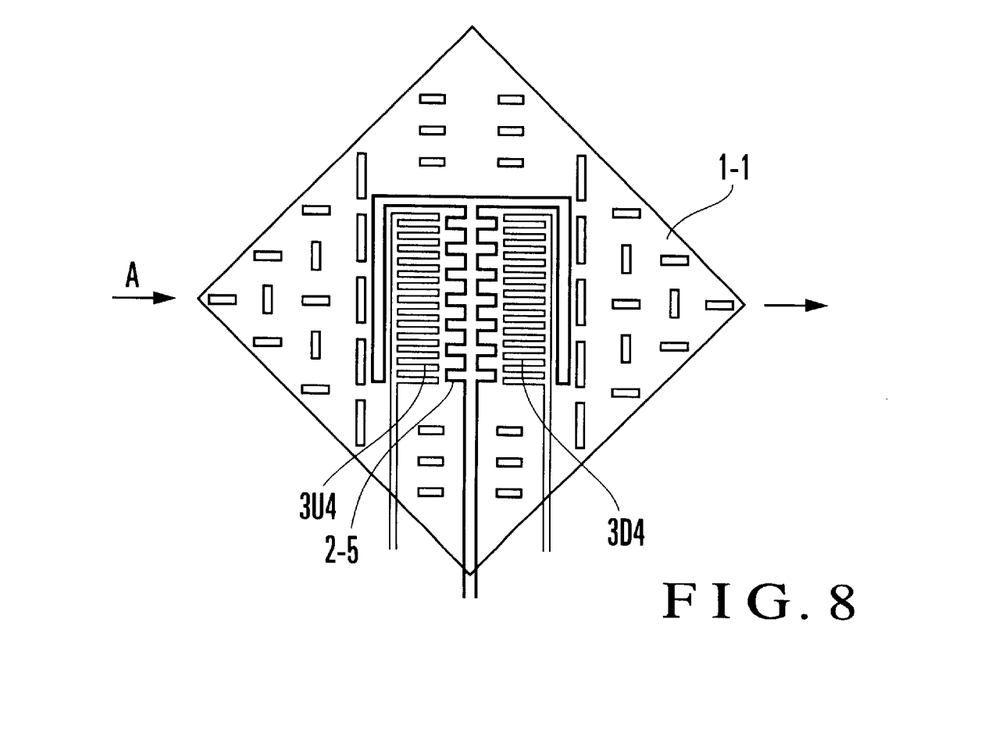
FIG. 8 is a plan view showing an example of a variation of a pattern layout of the temperature sensor and the heater on a diaphragm portion of a flow velocity detector related to the present invention.
Figure 9:
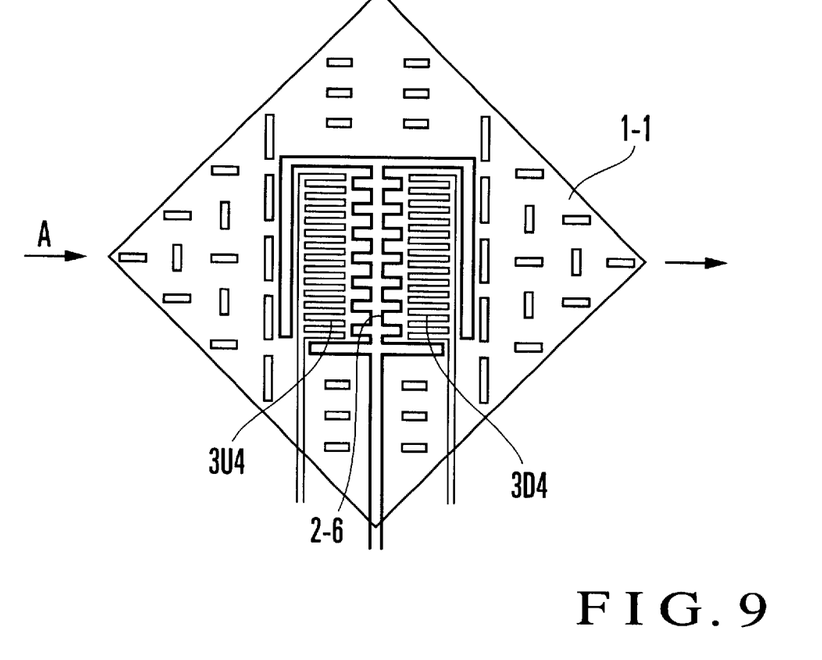
FIG. 9 is a plan view showing an example of a variation of a pattern layout of the temperature sensor and the heater on a diaphragm portion of a flow velocity detector related to the present invention.
Figure 10:
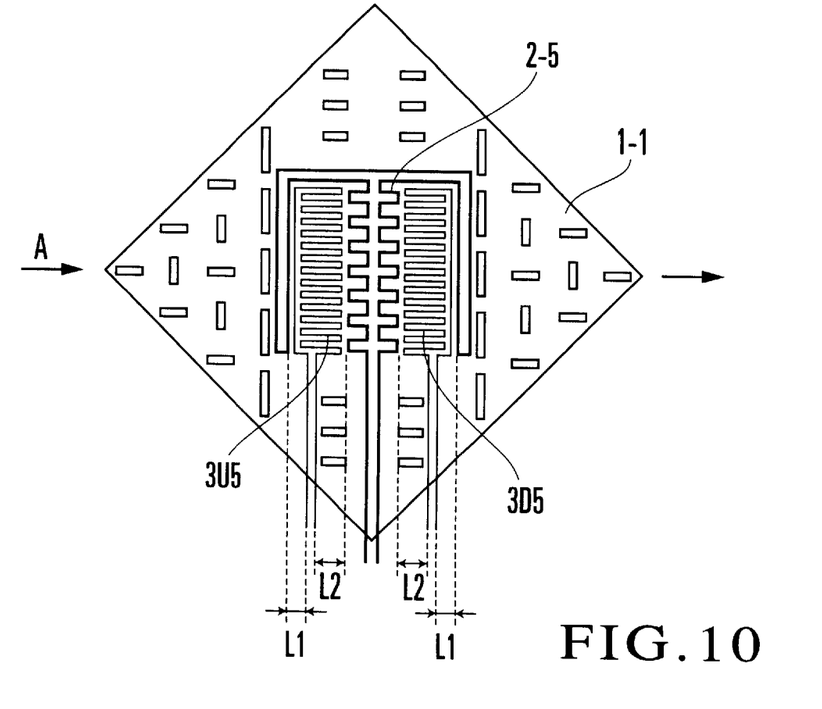
FIG. 10 is a plan view showing an example of a variation of a pattern layout of the temperature sensor and the heater on a diaphragm portion of a flow velocity detector related to the present invention.

In FIG. 8, part of the heater 2-5 is extended to surround each temperature sensor 3U4, 3D4 on three sides. In FIG. 9, part of the heater 2-6 is extended to surround each temperature sensor 3U4, 3D4 on four sides. In FIG. 10, part of heater 2-5 is extended to surround each temperature sensor 3U5, 3D5 on three sides, and the derivation parts of the signal from each temperature sensor 3U5, 3D5 are provided in the position farthest from the heater 2-5 (L1=L2).

In addition, in FIG. 4—FIG. 6, the signal derivation parts of each temperature sensor 3U, 3D are provided in the position farthest from the heater 2. As thus described, by providing the signal derivation parts of each temperature sensor 3U, 3D at the positions farthest from the heater 2, every effort is made to minimize the heat quantity escaping to the substrate 1 in the outside of the diaphragm portion 1-1 through the signal derivation parts of each temperature sensor 3U, 3D. Since the quantity of heat moving by the thermal conductivity is in proportion to the temperature difference, the signal derivation parts of each temperature sensor 3U, 3D will be able to make the temperature difference small and reduce the heat escape, when the parts having the lower temperature apart from the heater 2 and the substrate 1 are connected, instead of connecting the high temperature parts close to the heater 2 and the substrate 1 having the approximate ambient temperature.

By applying the pattern layout as shown in FIG. 5, owing to the same principles of each temperature sensor 3U1, 3D1, as explained previously, the heat transfer efficiency from the heater 2-2 rises, and the heat association between the heater 2-2 and each temperature sensor 3U2, 3D2 is raised.

By applying the pattern layout as shown in FIG. 6—FIG. 10, the area where the heater 2 and each temperature sensor 3U, 3D come close to each other increases, the heat transfer efficiency from the heater 2 to each temperature sensor 3U, 3D rises, and the heat association between the heater 2 and each temperature sensor 3U, 3D is raised.

As a reference, the flow rate-sensor output characteristics, when the pattern layout of FIG. 6 is applied, are shown as the characteristics III in FIG. 11, and the flow rate-sensor output characteristics, when the pattern layout of FIG. 9 is applied, are shown as the characteristics IV in FIG. 11. As shown in FIG. 11, the sensitivity at a high flow rate (the lean of the curved lines on the chart) becomes greater in the characteristics III, rather than in the characteristics II, and in the characteristics IV, rather than in the characteristics III.

Further, in FIG. 3—FIG. 10, although the pattern width of each temperature sensor 3U, 3D is made to be narrower than the pattern width of the heater 2, it is also acceptable as the constitution to make the pattern width of both to be the same, or to make the pattern width of the heater 2 narrower than the pattern width of each temperature sensor 3U, 3D. In the previously described embodiment, the pattern width of the heater 2 is made to be wide in terms of the reliability, since an electric current flows in larger quantity in the heater 2 as compared with each temperature sensor 3U, 3D, and the pattern width of each temperature sensor 3U, 3D is made to be as narrow as possible for increasing the sensitivity and for increasing the resistance value. In addition, in all the embodiments of FIG. 1—FIG. 10, it is desirable to position the heater 2 and each temperature sensor 3U, 3D to be as close to each other as possible.

For the detection of a high flow rate, although it is assumed to be advisable that the thickness of each temperature sensor 3U, 3D is made be thick to increase the heat transfer efficiency and to increase the heat capacity, the increase in the thickness will cause the increase in the electric power consumption and the response speed will becomes slow. On the other hand, according to the present embodiment, since the heat transfer efficiency can be increased without making the thickness of each temperature sensor 3U, 3D to be thick, the power consumption will not become larger than necessary, and the response speed will not become slow. In addition, according to the present embodiment, since the pattern layout of each temperature sensor 3U, 3D or the pattern layout of each temperature sensor 3U, 3D, as well as the one of the heater 2, is changed only, no difficulty will be caused in the mass production.

Industrial Applicability

As is obvious from what was explained above, according to the present invention, the heat from the heater heats the crank-shaped connection parts of the temperature sensors formed in a comb tooth-shape, and then transfers through straight line parts along the crank-shapes of the temperature sensors in the direction approximately in parallel with the flow direction of the detected fluid, and it will become possible to detect a high flow rate without causing any difficulty in the mass production, increasing the heat association between the heater and the temperature sensors.

What is claimed is:

1. A flow velocity detector comprising:
   a substrate;
   a diaphragm portion provided on said substrate;

a heater provided on said diaphragm portion;

temperature sensors formed on both sides of said heater, wherein said temperature sensors are formed in comb tooth-shape having recessed and projected sections, and said recessed and projected sections of the temperature sensors are positioned approximately in parallel with the flow direction of the detected fluid; and wherein said comb tooth-shape temperature sensors are positioned a defined distance from said heater such that said temperature sensors and said heater are not superposed on each other.

2. A flow velocity detector according to claim 1, wherein said heater is formed to be in the comb tooth-shape connecting a plurality of crank shapes, said heater with the recessed and projected direction of this comb tooth-shape is positioned approximately in parallel with the flow direction of the detected fluid.

3. A flow velocity detector according to claim 2, wherein at least parts of the respective irregularities of these comb tooth-shapes of said temperature sensor and said heater are positioned in such a way that they cut into each other.

4. A flow velocity detector according to claim 3, wherein convexed parts cutting into said temperature sensor side of the comb tooth-shapes of said heater are made to be wide in a flow direction of said detected fluid.

5. A flow velocity detector according to claim 1, wherein said heater is provided extendedly to surround at least part of the periphery of said temperature sensor.

6. A flow velocity detector according to claim 2, wherein said heater is provided extendedly to surround at least part of the periphery of said temperature sensor.

7. A flow velocity detector according to claim 3, wherein said heater is provided extendedly to surround at least part of the periphery of said temperature sensor.

8. A flow velocity detector according to claim 4, wherein said heater is provided extendedly to surround at least part of the periphery of said temperature sensor.

9. A flow velocity detector according to claim 1, wherein signal derivation parts from said temperature sensor are provided in the position farthest from said heater.

10. A flow velocity detector according to claim 1, wherein each of said temperature sensor with a crank shape includes a long portion and a short portion, each of the long portion parallel to each other of a crank shape of said temperature sensor has substantially equal length, and the short portion connecting the adjacent long portion crossing at right angles at the edge portion of a long portion is positioned to be even on the same straight line.

* * * * *